United States Patent [19]

Han

[11] Patent Number: 5,324,796
[45] Date of Patent: Jun. 28, 1994

[54] POLYARYLENE SULFIDE AND EPOXY-FUNCTIONALIZED SILOXANE BLENDS

[75] Inventor: Choong Y. Han, Saratoga County, N.Y.

[73] Assignee: General Electric Company, Pittsfield, Mass.

[21] Appl. No.: 984,634

[22] Filed: Dec. 2, 1992

[51] Int. Cl.⁵ .............................................. C08F 283/12
[52] U.S. Cl. ................................... 525/474; 525/537
[58] Field of Search ............................ 525/474, 537

[56] References Cited

U.S. PATENT DOCUMENTS

| | | | |
|---|---|---|---|
| 4,769,424 | 9/1988 | Takekoshi et al. | 525/435 |
| 4,787,991 | 11/1988 | Morozumi et al. | 252/12.4 |
| 4,794,163 | 12/1988 | Inoue et al. | 528/388 |
| 4,990,549 | 2/1991 | Delvin et al. | 525/209 |
| 5,122,578 | 6/1992 | Han et al. | 525/537 |

FOREIGN PATENT DOCUMENTS

| | | |
|---|---|---|
| 435427 | 7/1991 | European Pat. Off. . |
| 4016059 | 11/1991 | Fed. Rep. of Germany . |
| 3219146 | 9/1988 | Japan . |
| 3219147 | 9/1988 | Japan . |

*Primary Examiner*—Melvyn I. Marquis
*Assistant Examiner*—Helen F. Lee

[57] ABSTRACT

Blends of polyarylene sulfide and epoxy-functionalized siloxane polymers are provided which show improved tensile elongation and tensile strength compared to similarly prepared blends wherein the siloxane is not functionalized with an epoxy terminal group.

8 Claims, No Drawings

POLYARYLENE SULFIDE AND EPOXY-FUNCTIONALIZED SILOXANE BLENDS

BACKGROUND OF THE INVENTION

This invention relates to the preparation of compatible blends of polyarylene sulfide and epoxy-functionalized siloxane polymers and, more particularly, to the preparation of polyphenylene sulfide/epoxy-functionalized siloxane blends.

Polyarylene sulfides are crystalline engineering thermoplastics with high crystalline melting temperatures, typically on the order of 285° C., and are characterized by low flammability, high modulus, and excellent resistance to aggressive chemicals and solvents. However, their glass transition temperatures are very low, typically as low as 85° C. As a consequence, heat distortion temperatures are low in the absence of reinforcement with fillers such as glass fiber. In addition, polyarylene sulfides are very brittle, as evidenced by a tensile elongation for poly-phenylene sulfide usually no greater than about 2.5% and frequently below 1%. Typical characteristics include high flexural modulus, low elongation, and poor impact strength. The non-reinforced resin is commonly used in coatings.

A new market segment for PPS is automotive. While PPS has been used for automotive engine sensors and halogen lamp sockets, it has not been used for major components. Now that engine compartments are getting smaller, while performance requirements are getting higher, under-the-hood temperatures could go as high as 340° F. Past 1995, temperatures are foreseen at above 400° F. As temperatures increase, the contact with engine oil, fuels, gasoline, antifreeze, transmission fluid, and brake fluid become more critical for commonly used under-the-hood plastics. Because of the chemical resistance and high heat advantage of PPS, it is being considered for fuel systems, manifolds, and valve covers. The tensile strength for PPS is typically 20–27.7 at 1000 psi (ASTM D-638). The flexural strength is typically about 26–39.8 at 1000 psi, and the flexural modulus is typically about 1.7–2.2 at $10^6$ psi (ASTM D-790). Heat-deflection temperatures of 500° F. are typical, as well.

To enhance heat resistance and impact properties, polyarylene sulfide is often blended with other polymers such as polyphenylene ethers, as disclosed in U.S. Pat. No. 5,122,578 :,Han et. al.), the disclosure of which is incorporated by reference herein for typical reagents and conditions employed in the preparation of functionalized polyarylene compounds. However, it has been recognized that blends of polyarylene sulfides with other resins often undergo phase separation and delamination because the two resins are incompatible, and there is little or no phase interaction between the two resin phases. Molded parts made from such incompatible blends are typically characterized by low tensile and impact strength. Blends of polyarylene sulfides and siloxanes have provided improved impact properties. However, further improvements in impact properties and temperature resistance are desired.

SUMMARY OF THE INVENTION

It is an object of the present invention to provide blends of polyarylene sulfides and siloxane polymers with improved compatibility.

It is another object of the present invention to provide blends of polyarylene sulfides and siloxane polymers which have improved mechanical properties such as tensile elongation and tensile strength.

Upon further study of the specification and appended claims, further objects and advantages of this invention will become apparent to those skilled in the art.

The present invention is based on the discovery that epoxy-functionalized siloxane polymers are more compatible with polyarylene sulfides than non-functionalized siloxanes. The invention provides polyarylene sulfide/epoxy-functionalized siloxane blends with improved properties, including improved tensile elongation and tensile strength, while maintaining other physical properties such heat resistance, flexural strength, and Izod impact strength. Accordingly, the invention embraces such compositions.

DETAILED DESCRIPTION OF THE PREFERRED EMBODIMENTS

The polyarylene sulfides employed in the present invention are derived from known polymers containing arylene groups separated by sulfur atoms. They include polyphenylene sulfide (hereinafter "PPS") and substituted polyphenylene sulfides.

By reason of its availability and relatively low cost, PPS is often preferred. PPS is typically prepared by the reaction of p-dichlorobenzene with sodium sulfide in a polar solvent, optionally, with the use of a minor proportion of a branching agent such as 1,3,5-trichlorobenzene. Reference is made, for example, to U.S. Pat. No. 4,794,163, the disclosure of which is incorporated by reference herein for typical ranges and conditions employed in polyarylene sulfide preparation. After the initial processing step, the material may be air-cured at high temperatures to provide a partially branched, higher viscosity material that is suitable for thermoplastic processing. This curing stage can be eliminated, allowing the polymer to have a more linear structure. The mechanical strength and melt stability of the linear polymers show some improvement over the crosslinked PPS polymers. Other polyarylene sulfides may be cured as well, typically in the solid or liquid state, at temperatures in the range of from 225°–350° C. for periods of 2–6 hours. Suitable polyphenylene sulfides are available commercially. General Electric Company's SUPEC ® resins are examples of suitable poly(phenylene sulfide polymers. These commercially available PPS resins may be loaded with fillers by as much as 70 wt%.

It is often impractical to determine the molecular weight of polyarylene sulfide by reason of its insolubility in essentially all solvents used for molecular weight determination. Indirect characterization of relative molecular weight by melt-flow characteristics is commonly employed. For the purposes of this invention, the melt-flow characteristics of the polyarylene sulfides are not critical; values in the range of about 20–1000 g/10 minutes (315° C., 5 kg load) are typical.

The polyarylene sulfides may optionally contain functional groups such as epoxide-reactive functional groups. Typical groups within this definition are amino, carboxylic acid, and thiol groups. Primary amino groups are often preferred, with nitrogen contents of from 500–2000 ppm. It is frequently found that commercially available polyarylene sulfides prepared by conventional methods contain a measurable proportion of such amino groups, even if one of the above-described methods of preparation is not employed. This is probably a result of the incorporation in the molecule of moieties derived from the nitrogen-containing polar aprotic solvents such as N-methyl-2-pyrrolidone. The functional groups may be provided in a number of ways. One of these, disclosed, for example, in U.S. Pat. No. 4,769,424, comprises the reaction of a dihalodiarylsulfide with an alkaline metal sulfide to form a halogen-terminated polyarylene sulfide, which then undergoes further reaction with a substituted thiophenol, with elimination of hydrogen halide to form a polyarylene sulfide having the required substituents on the end groups. In another method, the polyarylene sulfide is prepared by the reaction of an alkali metal sulfide with a mixture of dichloroaromatic compounds and/or monochloroaromatic compounds (used as chain-termination agents), including at least one such compound which contains the required functional group. The third method disclosed and claimed in copending application Ser. No. 07/373,080, now abandoned, is a reaction of polyarylene sulfide with a disulfide containing the required functional groups, typically at temperatures in the range of 225°-375° C., in a solution of a high-boiling solvent such as 1-chloronaphthalene. This method is illustrated with greater particularity in Examples 2-10 of U.S. Pat. No. 5,122,578.

With the use of epoxide functional groups on the siloxane polymer, some degree of copolymer formation may be observed with PPS because of the functional groups, even if no detectable proportion of amino nitrogen is present on the PPS. The presence of copolymers within the blends of polyphenylene sulfide and functionalized siloxanes is not detrimental, and such copolymers may act as a compatibilizer for the homopolymeric constituents.

The siloxane polymers suitable for use in this invention can be linear or crosslinked, and their molecular weight can be selected over a wide range. The viscosity of these polymers varies with molecular weight and can range from the consistency of water to a thick gum. High molecular weight polymers can have a viscosity of about 1.5 million cp at 25° C., which are difficult to physically blend. Therefore, the molecular weight of the siloxane polymer is preferably limited to avoid processing difficulties. A chain length greater than about 75 SiO repeating units with corresponding molecular weights in excess of 5000 are desired. These siloxane polymers have a conventional backbone comprised of chemically combined siloxane units selected from the group consisting of an $R_3SiO_{0.5}$, $RR'SiO$, $R_2SiO$, $R'SiO$, $R'SiO_{1.5}$, $RsiO_{1.5}$, $R'R_2SiO_{0.5}$, and $SiO_2$ units, wherein each R and R' may represent a carbonaceous radical, and R' represents a carbonaceous radical such as R or a nitrogen atom, hydroxy, or amine group. These carbonaceous radicals comprise essentially carbon and include substituents such as 1-10 alkyl, 1-10 alkoxy, 6-18 aryl, 6-18 allyl, 7-19 alkoxyaryl, 6-18 aryloxy, and the like. Preferred siloxane polymers comprise a polydimethylsiloxane backbone and have more than 200 —$(CH_3)_2SiO$— repeating units. The siloxane polymer backbone, preferably polydimethylsiloxane, is epoxy-functionalized in that they have epoxy groups of the Formula Z incorporated therein:

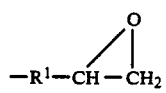

wherein $R^1$ is a divalent aliphatic ($C_{1-10}$), cycloalkyl($C_{5-20}$) heterocyclic ($C_{4-9}$)), substituted or unsubstituted aromatic ($C_{6-9}$) hydrocarbon radical or a direct bond. It is preferable to incorporate these epoxy-functional groups onto an amine-functionalized or amino-terminated siloxane. Suitable amine-terminated siloxane polymers are well known and are available commercially such as the "G series" siloxane resins available from the General Electric Company. Incorporation of the epoxy-functionalized group is preferably accomplished by reaction with trimethylglycidyl cyanuric chloride (MGCC). This reagent and related epoxy chlorotriazines are preferred in that they provide epoxy groups which are very reactive. MGCC is the agent used in the preparation of the epoxy-functionalized PPO resin described in U.S. Pat. No. 5,122,578. Related epoxy chlorotriazines which can be utilized to incorporate functional groups in such polymers are defined by Formula VIII below:

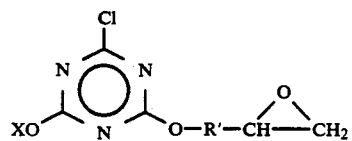

wherein X is an alkyl, cycloalkyl, aromatic radical, or an epoxy group of Formula Z, and $R^1$ is as defined above. $R^1$ is preferably methylene and typically lower alkylene.

Specific examples of suitable epoxy chlorotriazines include 2-chloro-4,6-diglycidoxy-1,3,5-triazine (DGCC), 2-chloro-4-methoxy-6-glycidoxy-1,3,5-triazine butoxy)-6-glycidoxy-1,3,5-triazine (BGCC), and 2-chloro-4-(2,4,6-trimethylphenoxy)-6-glycidoxy-1,3,5-chlorocyanurate, and 2,4,6-trimethylphenyl-glycidyl chlorocyanurate is equivalent to MGCC.

The reaction between the epoxy chlorotriazine and the amino-functional siloxane which provides the epoxy-functionalized siloxane polymer may be conducted in an organic solvent such as toluene, methylene chloride, or other organic liquid of similar polarity. Reaction temperatures in the range of about 20°-100° C. may be employed. Excess amounts of epoxy chlorotriazine are typically employed, which fall in the range of about 1-6% and preferably about 2-6% by weight of the amino-functional siloxane polymer. Following reaction, the excess epoxy chlorotriazine is washed away with water.

The blends of this invention are prepared by dry blending or melt blending the above-described polyarylene sulfides and epoxy-functionalized siloxanes. Known blending methods and equipment may be employed, including the use of batch and continuous devices. When melt blending, temperatures sufficiently high to melt the polyarylene sulfide are obtained, in contrast to dry blends wherein the siloxane polymer is coated onto particles of polyarylene sulfide polymers. The use of screw extruders is often preferred in melt-blending methods. Typical operating temperatures for the heat zone of the extruder are in the range of the 200°-350° C. Jar mills can be used to form dry blends.

The blends of this invention may contain any proportion of polyarylene sulfide and siloxane polymer. The ratio of these two components may range from 1:99 to 99:1 for siloxane:polyarylene sulfide. Preferred ratios range from 0.1-25:100 for siloxane:polyarylene sulfide, most preferably 1-10:100.

The blends of this invention can be injection molded using a conventional screw injection molding machine with heat zone temperatures typically above 600° F. The injection pressure may be between 8000–12,000 psi, depending on the part design and PPS compound. The flow rate of these blends allows for long and thin mold sections to be filled. The molded material can be dried by using a dehumidifying hopper dryer or, if necessary, in a conventional oven. Precise mold temperature control is helpful to obtaining high heat dimensional stability for parts obtained from the blends of this invention. A measured mold temperature of between 275°–325° F. is needed for the PPS to crystalize. Temperatures approximating this range may be used for the blends of this invention, particularly those with high levels (>50 wt%) of PPS. With temperatures below this range, the part may or may not be crystalline and, when in service, may shrink.

The invention also includes blend compositions containing additional additives, including elastomeric impact modifiers, dyes and pigments, which are introduced for their additive effect and are compatible with the polyarylene sulfide or the siloxane polymer. These include the modified polyphenylene ether polymers disclosed in U.S. Pat. No. 5,122,578.

The presence of a third polymer may allow for incorporation of other additives. Particularly desirable is the incorporation of impact modifiers derived from the vinyl aromatic monomers. These include AB- and ABA-type block copolymers and vinyl aromatic conjugated diene coreshell graft copolymers. These are described more particularly in U.S. Pat. No. 5,122,578 at columns 11–12.

The proportion of impact modifier or other resinous additive to the blend constituents is subject to wide variation and often depends on compatibility with the polyarylene sulfide. Impact modifiers which are compatible are expected to be useful at levels up to 50% per 100 parts of the polyarylene sulfide.

The presence of other conventional materials in the blends of this invention is also contemplated. This includes fillers, reinforcements, inhibitors, mold-release agents, and the like. Fibrous fillers, such as glass, graphite, and polyamide fibers, are often employed, with glass fibers frequently being preferred because their presence may further increase the heat distortion temperature of the composition. The proportion of fibrous filler in the composition can be up to about 70% by weight but is typically about up to 30% by weight, based on the total composition.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosure of all applications, patents, and publications, cited herein, are hereby incorporated by reference.

EXPERIMENTAL

In the following examples, the polyarylene sulfides employed were resins having the following characteristics, with the melt flows being values for 10 minutes determined at 300° C. and 5 kg load:

BH—A partially branched, lightly cured polyphenylene sulfide prepared by a conventional polyphenylene sulfide process comprising about 1000 ppm nitrogen.

BL—A conventional, lightly cured, partially branched PPS resin with a lower melt flow than BH.

LMW—A low molecular weight, conventional, uncured PPS resin with about 1000 ppm nitrogen and a melt flow greater than 600 g/10 min. at 300° C., 5 kg load.

HMW—A linear, high molecular weight, conventional linear PPS resin with about 1000 ppm nitrogen and a melt flow lower than LMW.

CAF—A cured, amine-functionalized (3,5-dichloroaniline comonomer) PPS resin with an amine content of 1900 ppm.

CTAF—A cured, amine-functionalized (3,5-diaminochlorobenzene end-capping agent) PPS resin with a nitrogen content of 1500 ppm.

MTAF—A cured, amine-functionalized PPS resin which is essentially modified CTAF resin made by a different process.

NTAF—A linear, high molecular weight PPS resin similar to HMW with a sodium content of 660 ppm.

The epoxy-functionalized siloxane polymer used in the examples is obtained by first dissolving an amino-functional dimethyl siloxane obtained from GE Silicones, designated "G 290", for a degree of polymerization of 290, in an organic medium to provide a polymer solution. MGCC in a solution of methylene chloride or toluene is introduced to this solution in excess and stirred overnight. The mixture is then washed with water several times, and the solvent is evaporated to give the epoxy-functionalized siloxane polymer.

EXAMPLE 1

A blend in accordance with the present invention is prepared with an epoxy-functionalized siloxane polymer produced as described in the "Experimental" section and a polyphenylene sulfide BH resin. The polyphenylene sulfide is in powder form and is used in an amount of about 95 wt%. Dry blends of PPS and the epoxy-functionalized siloxane polymer are mixed in a jar mill and extruded on a corotating intermeshing twin strew extruder at temperatures of from 130°–290° C. with vacuum venting. The extrudates are quenched in water, pelletized and dried in a circular air oven at 100°–110° C. and molded into test specimens, which are tested for notched Izod impact strength (ASTM Method D256), tensile properties (ASTM Method D638), flexural properties (ASTM Method D790), and heat distortion temperature at 0.8 mpa (ASTM Method D648). The unnotched Izod impact strength is also tested (modification of ASTM Method D256). Typical values are reported in Table 1.

COMPARATIVE EXAMPLE

An identical polyphenylene sulfide BH resin as used in Example 1 is dry blended with an amino-terminated siloxane polymer, provided by GE under the trade designation G-290, which was not epoxy-functionalized. This siloxane polymer has the same dimethylsiloxane backbone as the siloxane polymer utilized in Example 1 but has amino-functional terminal groups which are not reacted with epoxy chlorotriazine. The dry blend is extruded on a corotating intermeshing twin strew extruder at substantially identical temperatures to those reported in Example 1, with vacuum venting. The extrudates are quenched in water, pelletized, dried in a circular air oven at a temperature of 100°–110°, and molded into test specimens. These test specimens are then tested for identical properties as those of the specimens produced in Example 1. Typical results from these tests are reported in Table 1 below:

TABLE 1

PPS/Siloxane Blends

| Ingredients | Comparative Example | Example 1 |
|---|---|---|
| BH resin powder | 95 | 95 |
| amino-terminated siloxane with DP = 290 | 5 | — |
| Epoxy-functionalized siloxane | — | 5 |
| Heat deflection temperature at 264 psi, F. | 213 | 213 |
| Unnotched Izod, ft-lb/in | 3.9 | 4.9 |
| Notched Izod, ft-lb/in | 0.6 | 0.5 |
| Tensile elongation, % | 2.6 | 9.2 |
| Tensile strength, Kpsi | 6.4 | 9.1 |
| Flexural strength, Kpsi | 15.6 | 15.8 |
| Flexural modulus, Kpsi | 476 | 476 |

EXAMPLE 2

Various polyphenylene sulfide resins are blended with the epoxy-terminated siloxane polymer of Example 1 in a 95:05 ratio to provide test specimens. These specimens are described in Example 1.

The physical properties of these blends are reported below in Table 2:

TABLE 2

| PPS Resin | PPS/Epoxy-Functionalized Siloxane Blends | | | | | | | |
|---|---|---|---|---|---|---|---|---|
| | BH | LWM | HMW | CAF | CTAF | BL | MTAF | NTAF |
| Heat deflection temperature at 264 psi, °C. | 105 | 104 | 118 | 108 | 108 | 100 | 104 | 104 |
| Unnotched Izod, ft-lb/in | 5.8 | 9.9 | 4.5 | 5.6 | 13.2 | 12.9 | * | 9.3 |
| Notched Izod, ft-lb/in | 0.7 | 0.8 | 0.5 | 0.4 | 0.6 | 0.5 | 0.7 | 0.6 |
| Tensile elongation, % | 9.2 | 3.9 | 2.2 | 3.8 | 6.9 | 8.9 | 11.5 | 17.3 |
| Tensile strength, Kpsi | 9.1 | 8.2 | 5.8 | 8.7 | 9.5 | 9.3 | 8.7 | 8.8 |
| Flexural strength, Kpsi | 15.2 | 15.4 | 15.0 | 14.4 | 15.4 | 15.3 | 15.2 | 15.0 |
| Flexural modulus, Kpsi | 447 | 447 | 448 | 469 | 452 | 452 | 453 | 443 |

*Unnotched Izod values could not be obtained because two of the samples did not break Table 2 shows that improvements in physical properties vary significantly with the PPS resin used.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A composition comprising polyphenylene sulfide polymers blended with an epoxy-functionalized siloxane polymer having a ratio of 0.1 to 25 parts by weight epoxy-functionalized siloxane polymer per 100 parts polyarylene sulfide, said polyphenylene sulfide being branched by heat curing in an oxidative atmosphere and having a nitrogen content of 500–2500 ppm with a melt flow index in the range of 20–2000 g/10 minutes at 315° C. under a 5 kg load wherein the epoxy functionalized siloxane has at least 200 repeating units of the formula—$R_2SiO$—and at least one epoxy terminal group of the formula

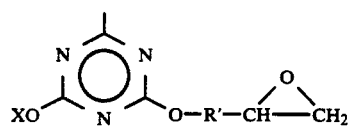

wherein R is 1–10 alkyl, 1–10 alkoxy, 6–18 allyl, 6–18 alkyl, 7–19 alkoxyaryl, and 6–18 aryloxy, wherein X is an alkyl, cycloalkyl, aromatic radical, or an epoxy group of Formula Z

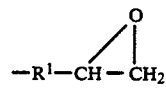

wherein $R^1$ is a divalent aliphatic ($C_{1-10}$), heterocyclic ($C_{4-9}$), cycloalkyl ($C_{5-10}$), aromatic $C_{(6-19)}$ hydrocarbon radical, or a direct bond.

2. A composition as in claim 1, wherein the epoxy-functionalized siloxane has a dimethylsiloxane backbone.

3. A composition as in claim 2, wherein the epoxy-functionalized siloxane has epoxy groups obtained from the reagent 2-chloro-4-(2,4,6-trimethylphenoxy)-6-glycidoxy-1,3,5-triazine.

4. A composition as in claim 1, wherein the weight ratio of epoxy-functionalized siloxane to polyphenylene sulfide ranges from 1–10:100.

5. A composition as in claim 1, having a tensile elongation greater than 5% under ASTM D638.

6. A composition as in claim 1, additionally comprising additives selected from the group consisting of compatible impact modifiers, fiber reinforcement, fillers, and compatible polymers with epoxy-functional groups.

7. A composition as in claim 1, wherein the polyphenylene sulfide contains an epoxide reactive functional group which can form copolymers with the siloxane.

8. A composition as in claim 1, wherein the epoxide reactive functional group is an amine.

* * * * *